United States Patent
Yamamoto et al.

(10) Patent No.: US 11,797,668 B2
(45) Date of Patent: Oct. 24, 2023

(54) SAMPLE DATA GENERATION APPARATUS, SAMPLE DATA GENERATION METHOD, AND COMPUTER READABLE MEDIUM

(71) Applicant: Mitsubishi Electric Corporation, Tokyo (JP)

(72) Inventors: Takumi Yamamoto, Tokyo (JP); Keisuke Kito, Tokyo (JP); Tomonori Negi, Tokyo (JP); Kiyoto Kawauchi, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 914 days.

(21) Appl. No.: 16/641,603

(22) PCT Filed: Oct. 11, 2017

(86) PCT No.: PCT/JP2017/036875
§ 371 (c)(1),
(2) Date: Feb. 24, 2020

(87) PCT Pub. No.: WO2019/073557
PCT Pub. Date: Apr. 18, 2019

(65) Prior Publication Data
US 2021/0157909 A1 May 27, 2021

(51) Int. Cl.
*G06F 21/55* (2013.01)
*G06F 21/56* (2013.01)
*H04L 9/40* (2022.01)

(52) U.S. Cl.
CPC ............ *G06F 21/554* (2013.01); *G06F 21/56* (2013.01); *H04L 63/1416* (2013.01); *G06F 2221/033* (2013.01)

(58) Field of Classification Search
None
See application file for complete search history.

(56) References Cited

U.S. PATENT DOCUMENTS 10,063,581 B1 *  8/2018  Averbuch ............ H04L 63/1425
10,147,049 B2 * 12/2018  Chari ..................... G06N 20/20
(Continued)

FOREIGN PATENT DOCUMENTS

JP   2010-15513 A    1/2010
JP   2013-196390 A   9/2013
(Continued)

OTHER PUBLICATIONS

International Search Report for PCT/JP2017/036875 (PCT/ISA/210) dated Dec. 12, 2017.

*Primary Examiner* — Christopher C Harris
(74) *Attorney, Agent, or Firm* — Birch, Stewart, Kolasch & Birch, LLP

(57) ABSTRACT

An acquisition unit (10) acquires normal sample data and non-normal sample data. A model generation unit (120) generates a normal model representing the normal sample data. A change unit (141) generates a non-normal feature vector of the non-normal sample data, and generates a non-normal changed vector obtained by changing an element of the non-normal feature vector. When the non-normal changed vector and the normal model are similar to each other, a verification unit (142) executes a process using sample data represented by the non-normal changed vector. The verification unit (142) verifies whether an anomalous event is detected by a detection device. Upon verification that an anomalous event is not detected, the verification unit (142) determines whether an anomalous event is present, independently of the detection device. Upon determination that an anomalous event is present, the verification unit (142) stores the sample data represented by the non-normal changed vector as missed-detection sample data (154) in a storage unit (150).

15 Claims, 15 Drawing Sheets

(56) References Cited

U.S. PATENT DOCUMENTS

| | | | |
|---|---|---|---|
| 11,308,049 B2 * | 4/2022 | Suleiman | H04L 41/142 |
| 2003/0065409 A1 * | 4/2003 | Raeth | G08B 31/00 |
| | | | 700/28 |
| 2011/0055123 A1 | 3/2011 | Kennedy | |
| 2014/0040173 A1 * | 2/2014 | Sagher | G06V 30/194 |
| | | | 706/12 |
| 2014/0082730 A1 | 3/2014 | Vashist et al. | |
| 2015/0150131 A1 | 5/2015 | Boutnaru et al. | |
| 2016/0173514 A1 | 6/2016 | Boutnaru et al. | |
| 2016/0173515 A1 | 6/2016 | Boutnaru et al. | |
| 2016/0217285 A1 | 7/2016 | Boutnaru et al. | |
| 2016/0219064 A1 | 7/2016 | Boutnaru et al. | |
| 2017/0032120 A1 | 2/2017 | Tolpin et al. | |
| 2018/0131707 A1 | 5/2018 | Boutnaru et al. | |

FOREIGN PATENT DOCUMENTS

| | | |
|---|---|---|
| JP | 2014-60722 A | 4/2014 |
| JP | 2015-215906 A | 12/2015 |
| JP | 2016-507115 A | 3/2016 |
| JP | 5906855 B2 | 4/2016 |
| JP | 2016-206950 A | 12/2016 |

\* cited by examiner

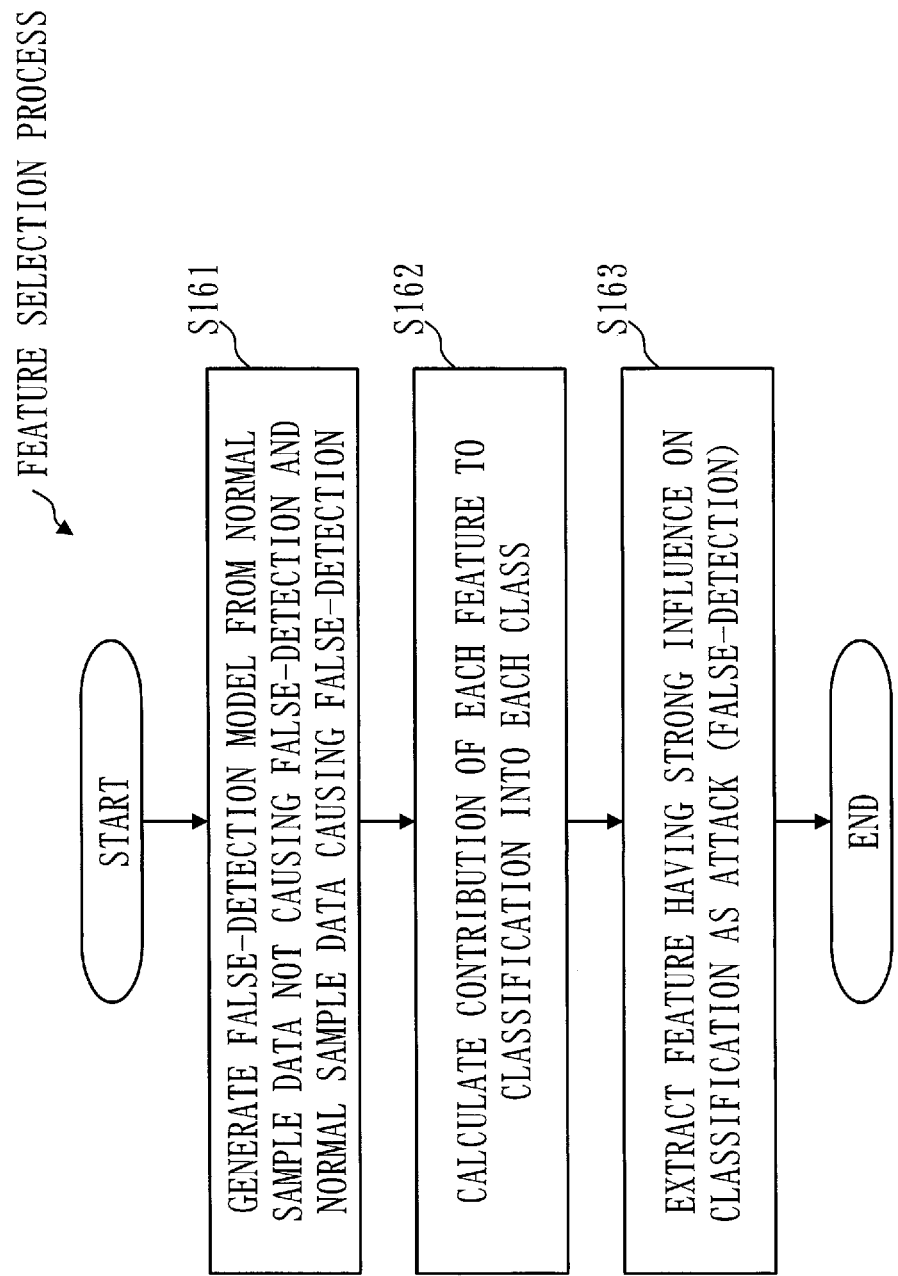

SAMPLE DATA GENERATION APPARATUS, SAMPLE DATA GENERATION METHOD, AND COMPUTER READABLE MEDIUM

TECHNICAL FIELD

The present invention relates to a sample data generation apparatus, a sample data generation method, and a sample data generation program to generate sample data for a detection device for detecting an anomalous event in a system. In particular, the present invention relates to a sample data generation apparatus, a sample data generation method, and a sample data generation program for improving the detection accuracy of a detection device.

BACKGROUND ART

In detection techniques for detecting anomalous events such as failures, attacks, or other anomalies, false detections, that is, false positives and missed detections, that is, false negatives occur in many cases. A false detection means detecting a normal event that should not be detected. A missed detection means not detecting an anomalous event that should be detected. False detections and missed detections occur because a sufficient number and a sufficient variety of normal events and anomalous events cannot be prepared in the design and evaluation of a detection technique. Therefore, in order to increase the accuracy of the design and evaluation of a detection technique, a technique for generating sufficient sample data related to false detections and missed detections that the detection technique may cause is required.

Patent Literature 1 discloses a technique in which a malicious program such as malware is mutated so as to generate sample data of malicious programs that cannot be detected by existing malicious program detection products. A specific example of the existing malicious program detection products is anti-virus software. The technique of Patent Literature 1 performs a test to check that the generated sample data is not detected by known products and maintains malicious functionality. The technique of Patent Literature 1 enhances a malicious program detection technique using sample data that has passed the test.

Patent Literature 2 discloses a technique for efficiently creating attack data of binary data. The technique of Patent Literature 2 changes a byte sequence of attack data one byte at a time to make it similar to normal data. Then, this binary data is input into a system to identify binary data that causes an anomaly in the system. In this way, attack data having the features of normal data is automatically generated. The technique of Patent Literature 2 can efficiently detect an anomaly in the system and strengthen the system by using the attack data having the features of normal data.

CITATION LIST

Patent Literature

Patent Literature 1: JP 2016-507115 A
Patent Literature 2: JP 5906855 B

SUMMARY OF INVENTION

Technical Problem

The technique of Patent Literature 1 does not take into consideration the normal state of a monitoring target in the malicious program detection technique. In an attack detection technique, attack detection rules are defined based on the features of malicious programs not included in normal programs, in order to prevent normal files from being falsely detected. Therefore, a sophisticated attacker creates a malicious program that performs malicious processing within the range of the features of normal programs. However, the technique of Patent Literature 1 cannot enhance an attack detection program so as to enable the detection of a malicious program that performs malicious processing within the range of the features of normal programs. In addition, the technique of Patent Literature 1 does not provide sample data of false detections.

The technique of Patent Literature 2 does not include checking of whether the generated attack data is effective as an attack. For this reason, a sophisticated attacker considers input data that causes the system to perform malicious processing with data within the normal range that does not cause any anomaly in the system. However, the technique of Patent Literature 2 cannot generate input data that causes the system to perform malicious processing with only data within the normal range that does not cause any anomaly in the system. In addition, the technique of Patent Literature 2 does not provide sample data of false detections.

It is an object of the present invention to automatically prepare sufficient sample data related to missed detections and false detections that a detection device may cause, in order to increase the accuracy of design and evaluation of the detection device.

Solution to Problem

A sample data generation apparatus according to the present invention includes an acquisition unit to acquire pieces of normal sample data, each of which is a normal event in a system and pieces of non-normal sample data, each of which is an anomalous event in the system;

a model generation unit to generate a normal model representing the pieces of normal sample data;

a change unit to, for each piece of non-normal sample data of the pieces of non-normal sample data, generate a non-normal feature vector representing, as a vector, features of the non-normal sample data, and generate a non-normal changed vector obtained by changing an element of the non-normal feature vector; and a verification unit to, when the non-normal changed vector and the normal model are similar to each other, execute a process using sample data represented by the non-normal changed vector on the system, verify whether an anomalous event is detected by a detection device for detecting an anomalous event in the system, and upon verification that an anomalous event is not detected by the detection device, determine whether an anomalous event is present in the system, independently of the detection device, and upon determination that an anomalous event is present, store the sample data represented by the non-normal changed vector in a storage unit as missed-detection sample data of the detection device.

Advantageous Effects of Invention

In a sample data generation apparatus according to the present invention, a change unit generates a non-normal feature vector representing, as a vector, features of non-normal sample data, and generates a non-normal changed vector obtained by changing an element of the non-normal feature vector. When the non-normal changed vector and the normal model are similar to each other, a verification unit verifies whether an anomalous event is detected by a detection device when a process using the non-normal changed vector is executed. Upon verification that an anomalous event is not detected by the detection device, the verification unit determines whether an anomalous event is present in a system, independently of the detection device. Upon determination that an anomalous event is present, the verification unit stores sample data represented by the non-normal changed vector in a storage unit as missed-detection sample data of the detection device. Therefore, according to the sample data generation apparatus of the present invention, sample data that is similar to the normal model, is not detected by the detection device, and is an anomalous event can be generated by changing elements of the non-normal feature vector.

BRIEF DESCRIPTION OF DRAWINGS

FIG. 17 is a flowchart of a feature selection process according to the second embodiment.

DESCRIPTION OF EMBODIMENTS

Figure 1:
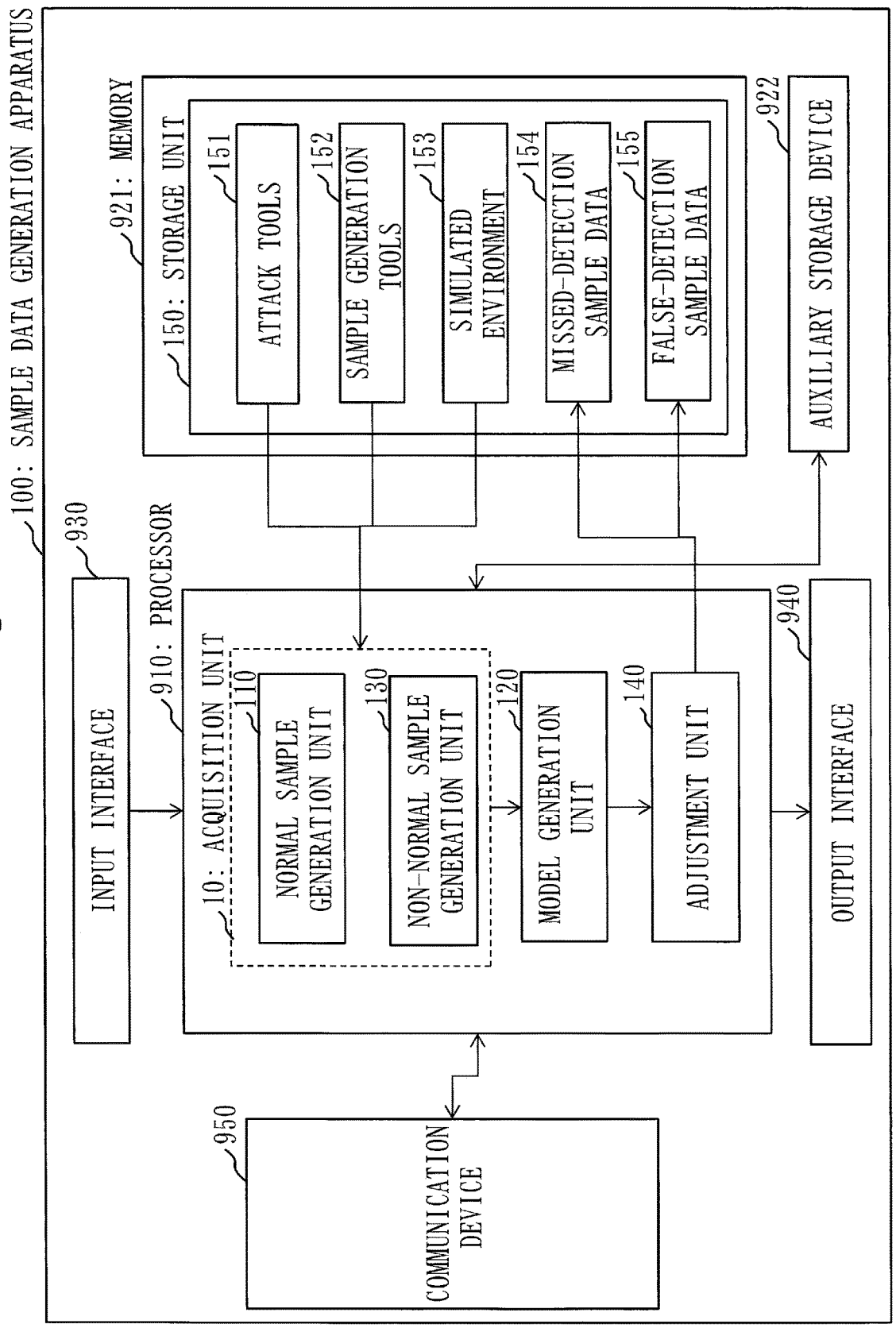
FIG. 1 is a configuration diagram of a sample data generation apparatus 100 according to a first embodiment.

Embodiments of the present invention will be described hereinafter with reference to the drawings. Throughout the drawings, the same or corresponding portions are denoted by the same reference signs. In the description of the embodiments, description of the same or corresponding portions will be suitably omitted or simplified.

First Embodiment

Description of Configuration

A configuration of a sample data generation apparatus 100 according to this embodiment will be described with reference to FIGS. 1 to 5.

The sample data generation apparatus 100 generates sample data for a detection device for detecting an anomalous event in a system. The sample data generation apparatus 100 aims to increase the detection accuracy of the detection device. The sample data generation apparatus 100 generates, as missed-detection sample data, an anomalous event that cannot be detected by the detection device. The sample data generation apparatus 100 also generates, as false-detection sample data, a normal event that is detected by the detection device. Note that the system that is the target of the detection device for detecting an anomalous event may be referred to as a target system.

The sample data generation apparatus 100 is a computer. The sample data generation apparatus 100 includes a processor 910, and also includes other hardware components such as a memory 921, an auxiliary storage device 922, an input interface 930, an output interface 940, and a communication device 950. The processor 910 is connected with the other hardware components via signal lines and controls these other hardware components.

Figure 2:
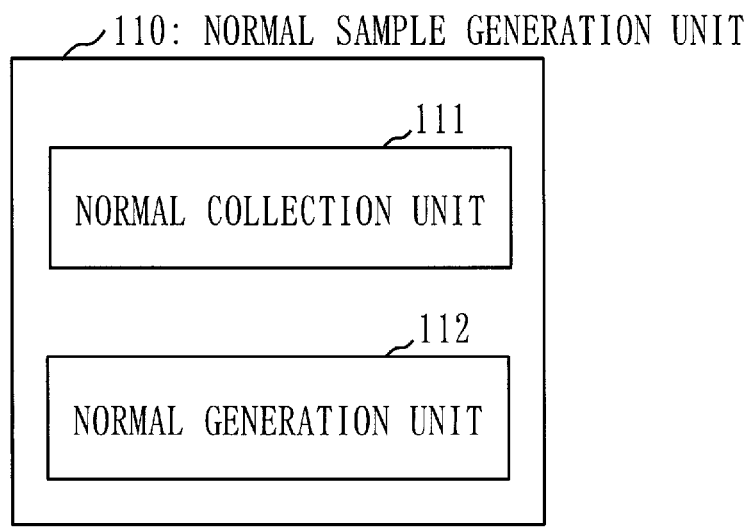
FIG. 2 is a configuration diagram of a normal sample generation unit 110 according to the first embodiment.
Figure 3:
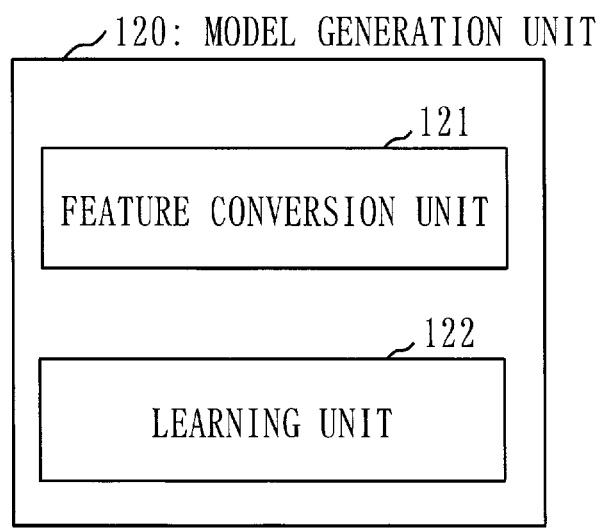
FIG. 3 is a configuration diagram of a model generation unit 120 according to the first embodiment.
Figure 4:
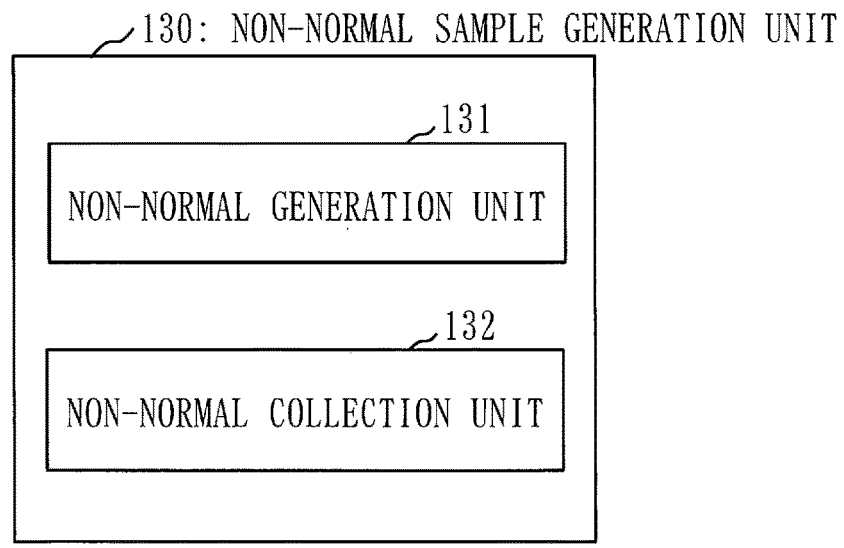
FIG. 4 is a configuration diagram of a non-normal sample generation unit 130 according to the first embodiment.
Figure 5:
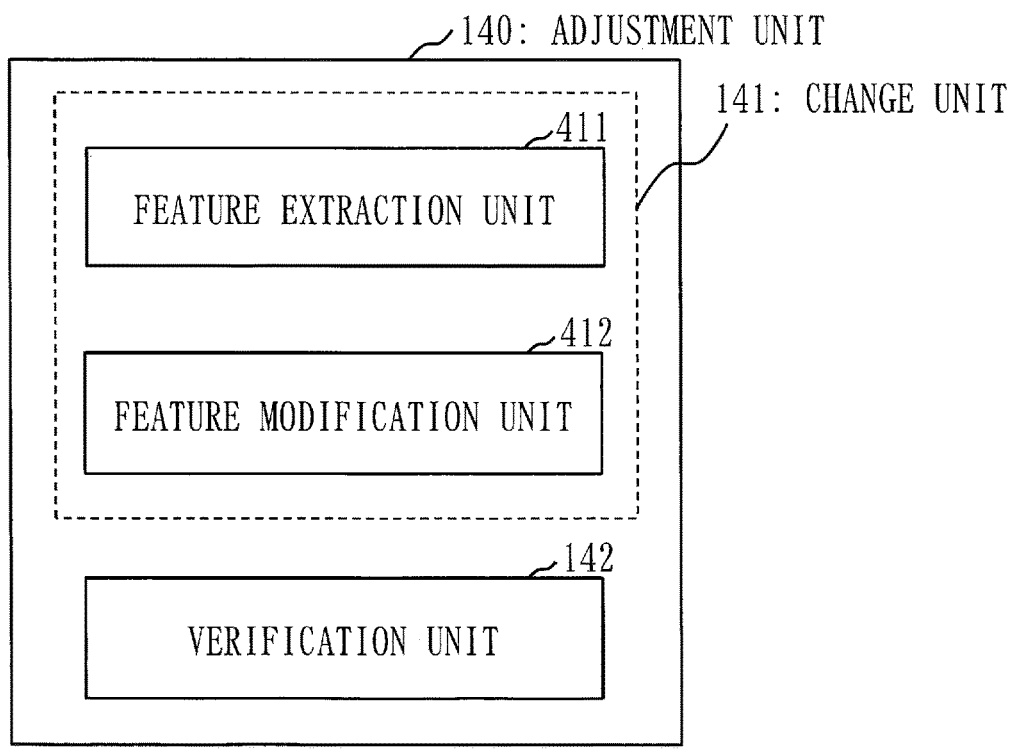
FIG. 5 is a configuration diagram of an adjustment unit 140 according to the first embodiment.

The sample data generation apparatus 100 includes, as functional elements, an acquisition unit 10, a model generation unit 120, an adjustment unit 140, and a storage unit 150. The acquisition unit 10 includes a normal sample generation unit 110 and a non-normal sample generation unit 130. As illustrated in FIG. 2, the normal sample generation unit 110 includes a normal collection unit 111 and a normal generation unit 112. As illustrated in FIG. 3, the model generation unit 120 includes a feature conversion unit 121 and a learning unit 122. As illustrated in FIG. 4, the non-normal sample generation unit 130 includes a non-normal generation unit 131 and a non-normal collection unit 132. As illustrated in FIG. 5, the adjustment unit 140 includes a change unit 141 and a verification unit 142. The change unit 141 includes a feature extraction unit 411 and a feature modification unit 412. The storage unit 150 stores attack tools 151, sample generation tools 152, a simulated environment 153, missed-detection sample data 154, and false-detection sample data 155.

The functions of the acquisition unit 10, the model generation unit 120, the change unit 141, and the verification unit 142 are realized by software. The storage unit 150 is provided in the memory 921.

The processor 910 is a device that executes a sample data generation program. The sample data generation program is a program for realizing the functions of the acquisition unit 10, the model generation unit 120, the change unit 141, and the verification unit 142.

The processor 910 is an integrated circuit (IC) that performs arithmetic processing. Specific examples of the processor 910 are a central processing unit (CPU), a digital signal processor (DSP), and a graphics processing unit (GPU).

The memory 921 is a storage device to temporarily store data. Specific examples of the memory 921 are a static random access memory (SRAM) and a dynamic random access memory (DRAM).

The auxiliary storage device 922 is a storage device to store data. A specific example of the auxiliary storage device 922 is an HDD. Alternatively, the auxiliary storage device 922 may be a portable storage medium such as an SD (registered trademark) memory card, CF, a NAND flash, a flexible disk, an optical disc, a compact disc, a Blu-ray (registered trademark) disc, or a DVD. HDD is an abbreviation for Hard Disk Drive. SD (registered trademark) is an abbreviation for Secure Digital. CF is an abbreviation for CompactFlash. DVD is an abbreviation for Digital Versatile Disk.

The input interface 930 is a port connected with an input device such as a mouse, a keyboard, or a touch panel. Specifically, the input interface 930 is a Universal Serial Bus (USB) terminal. Note that the input interface 930 may be a port connected with a local area network (LAN).

The output interface 940 is a port to which a cable of an output device such as a display is connected. Specifically, the output interface 940 is a USB terminal or a High Definition Multimedia Interface (HDMI, registered trademark) terminal. Specifically, the display is a liquid crystal display (LCD).

The communication device 950 is a device that communicates with other devices via a network. The communication device 950 has a receiver and a transmitter. The communication device 950 is connected to a communication network, such as a LAN, the Internet, or a telephone line, via wire or wirelessly. Specifically, the communication device 950 is a communication chip or a network interface card (NIC).

The sample data generation program is read by the processor 910 and executed by the processor 910. The memory 921 stores not only the sample data generation program but also an operating system (OS). The processor 910 executes the sample data generation program while executing the OS. The sample data generation program and the OS may be stored in the auxiliary storage device 922. The sample data generation program and the OS stored in the auxiliary storage device 922 are loaded into the memory 921 and executed by the processor 910. Note that part or the entirety of the sample data generation program may be embedded in the OS.

The sample data generation apparatus 100 may include a plurality of processors in place of the processor 910. These processors share the execution of the sample data generation program. Each of the processors is, like the processor 910, a device that executes the sample data generation program.

Data, information, signal values, and variable values that are used, processed, or output by the sample data generation program are stored in the memory 921 or the auxiliary storage device 922, or stored in a register or a cache memory in the processor 910.

The sample data generation program causes a computer to execute each process, each procedure, or each step, where each "unit" of the acquisition unit 10, the model generation unit 120, the change unit 141, and the verification unit 142 is interpreted as each "process", each "procedure", or each "step". A sample data generation method is a method performed by the sample data generation apparatus 100 through the execution of the sample data generation program.

The sample data generation program may be stored in and provided in a computer readable recording medium. Alternatively, the sample data generation program may be provided as a program product.

Description of Operation

Operation of each unit of the sample data generation apparatus 100 according to this embodiment will now be described.

Acquisition Process and Model Generation Process

Figure 6:
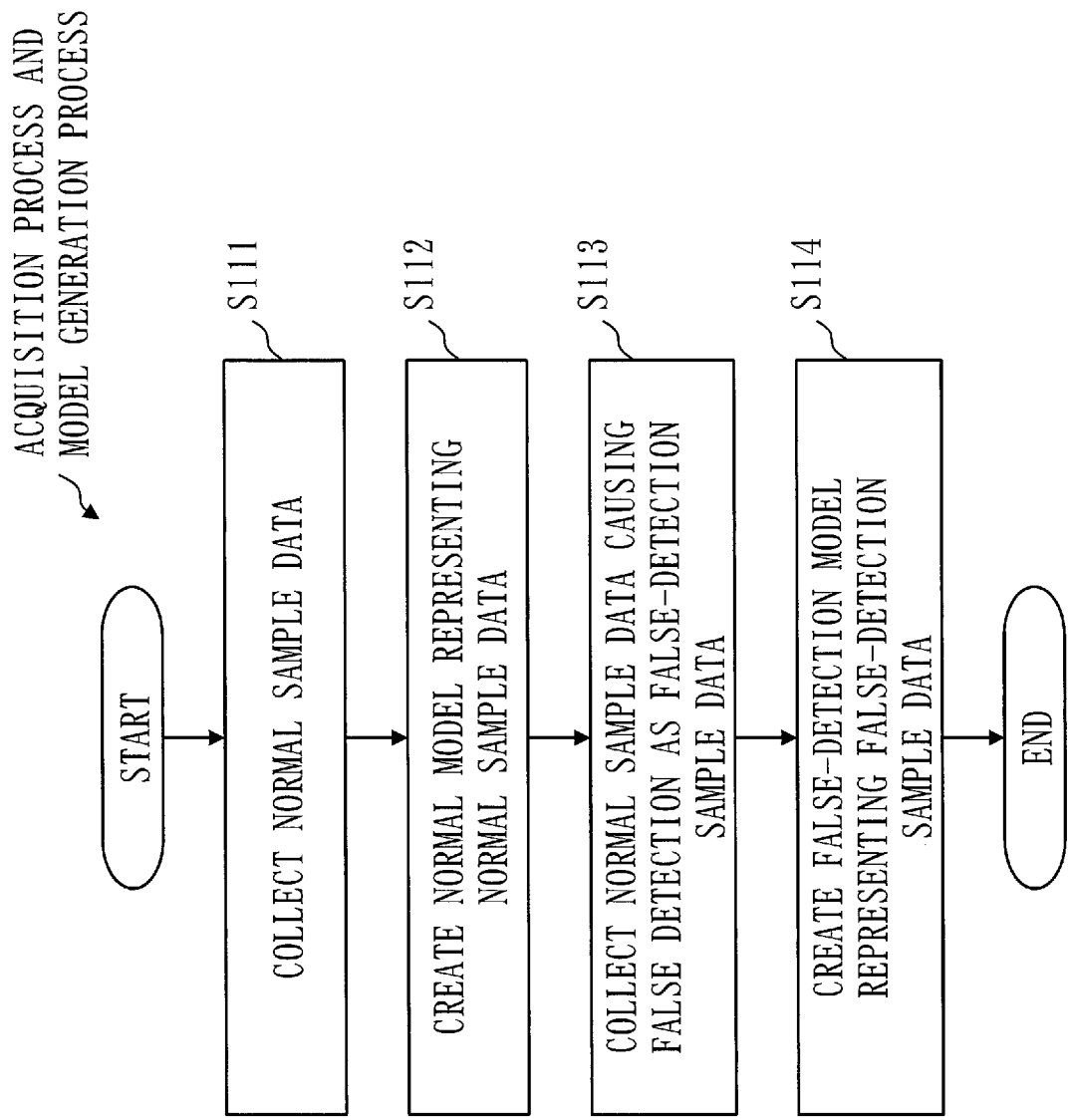
FIG. 6 is a flowchart of an acquisition process and a model generation process according to the first embodiment.

First, an acquisition process and a model generation process according to this embodiment will be described with reference to FIG. 6.

In step S111, the acquisition unit 10 acquires pieces of normal sample data, each of which is a normal event in the system. Specifically, the normal sample generation unit 110 collects sample data which is truly normal, that is, normal sample data from the target system. Specific examples of sample data are a communication packet, a proxy log, a system log, an email, and a file. A sensor corresponding to the type of sample data is provided in the target system so as to collect sample data. It is assumed that sample data which is not normal, that is, non-normal sample data is not included in the target system at this time.

The above will be described in more detail.

The normal collection unit 111 of the normal sample generation unit 110 collects sample data which is truly normal from the target system. The normal collection unit 111 also edits normal sample data collected from a different environment for compatibility with the target system. That is, the normal collection unit 111 collects sample data of normal events from another system other than the target system. Then, the normal collection unit 111 modifies the collected sample data for compatibility with the environment of the target system, so as to acquire pieces of normal sample data. Normal sample data collected from a different environment is a normal event in the different environment. For example, when the normal sample data collected from the different environment is a log, information such as a time stamp, an IP address, a host name, and a domain name may be different from those of a log in the environment of the target system. Accordingly, the normal collection unit 111 modifies the information such as a time stamp, an IP address, a host name, and a domain name for compatibility with information in the log collected from the target system.

The normal generation unit 112 of the normal sample generation unit 110 generates normal sample data in accordance with parameters, instead of collecting normal sample data. The normal generation unit 112 generates normal sample data in accordance with a feature vector of sample data. A tool for generating normal sample data in accordance with a feature vector of sample data is prepared for each target system. That is, the normal generation unit 112 uses the sample generation tools 152 for generating sample data of normal events in the system and the simulated environment 153 to acquire pieces of normal sample data. This tool is also used for automatically generating false-detection sample data.

Note that the normal sample generation unit 110 may collect normal sample data sent periodically from a sensor installed in a system of an organization.

In step S112, the model generation unit 120 generates a model representing the pieces of normal sample data. A model representing normal sample data will be referred to as a normal model. The model generation unit 120 generates a normal model by learning a set of normal sample data, using technology such as machine learning. When machine learning is used, the model generation unit 120 uses a one-class classifier for classifying whether sample data is normal sample data or otherwise. In order to determine whether sample data is similar to normal sample data, the model generation unit 120 uses an identification algorithm that can obtain an identification score from the classifier. Before machine learning, the model generation unit 120 may perform processing such as pre-processing raw data of the sample data to extract predetermined features.

Note that the model generation unit 120 may use a set of non-normal sample data generated by the non-normal sample generation unit 130 to be described later. That is, the model generation unit 120 may use a two-class classifier for classification as normal sample data or non-normal sample data. If there is a difference in size between two sets, an approach often used for unbalanced sets of data is adopted, such as adjusting the number of pieces of sample data or adjusting the penalty for an incorrect answer.

The feature conversion unit 121 of the model generation unit 120 converts each piece of the pieces of normal sample data into a feature vector. The learning unit 122 of the model generation unit 120 uses machine learning technology to learn a normal model from the feature vectors obtained by conversion by the feature conversion unit 121.

Specifically, the feature conversion unit 121 converts an input piece of sample data into a format that facilitates processing, that is, into a feature vector. A specific example based on a proxy log will be described. For example, with regard to communication between a sender and a destination in a certain period, information arranged as elements, such as the frequency of communication, the size of data, and the frequency of a character string included in the data, is a feature vector $C=(c1, c2, \ldots, cn)$. If the collected sample data can be learned as it is, the feature conversion unit 121 is not necessary.

The learning unit 122 learns, as a model, a feature space representing normal sample data, using the feature vectors of normal sample data as learning data. Any method of learning may be used, provided that the learned model can be used to calculate a score for a newly given feature vector. A score is a value representing how similar a given feature vector is to normal sample data, that is, a similarity. The similarity is represented by a high value when the feature vector is similar to the model of normal sample data and by a low value when not similar. With the classifier of machine learning, a score corresponds to a probability of a predicted value.

In step S113, the model generation unit 120 acquires, as false-detection sample data, normal sample data that is falsely detected by the detection device, out of the pieces of normal sample data. The model generation unit 120 uses an existing detection engine to acquire normal sample data that causes a false detection by the existing detection engine. The model generation unit 120 inputs the pieces of normal sample data acquired by the normal sample generation unit 110 in step S111 into the existing detection engine. Then, the model generation unit 120 acquires, as false-detection sample data, normal sample data that causes a false detection.

In step S114, the model generation unit 120 generates, as a false-detection model, a model representing false-detection sample data. Specifically, the model generation unit 120 learns a set of normal sample data not causing false detections and a set of normal sample data causing false detections, using technology such as machine learning. Then, the model generation unit 120 generates a model representing normal sample data causing false detections, that is, false-detection sample data. A model representing false-detection sample data will be referred to as a false-detection model.

When machine learning is used, the model generation unit 120 is a two-class classifier for classification as normal sample data not causing a false detection or normal sample data causing a false detection. If there is a difference in size between two sets, an approach often used for unbalanced sets of data is adopted, such as adjusting the number of pieces of sample data or adjusting the penalty for an incorrect answer.

In this embodiment, machine learning is employed as the method for generating a model. The algorithm of machine learning is selected appropriately depending on the target system or information, or depending on costs.

Next, relationships between sample data and models will be described with reference to FIGS. 7 to 10.

Figure 7:
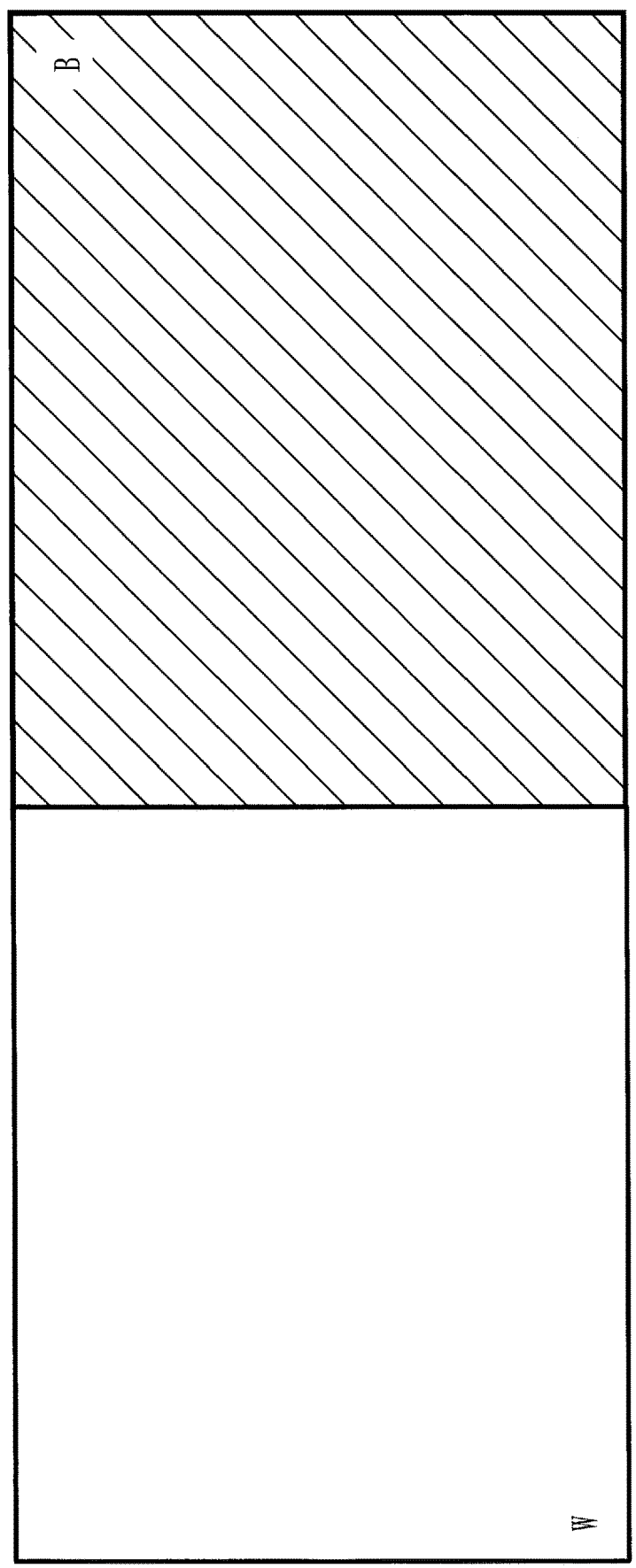
FIG. 7 is a diagram representing a population of normal sample data and a population of non-normal sample data according to the first embodiment.

In FIG. 7, a space W represents a population of normal sample data. A space B represents a population of non-normal sample data.

Figure 8:
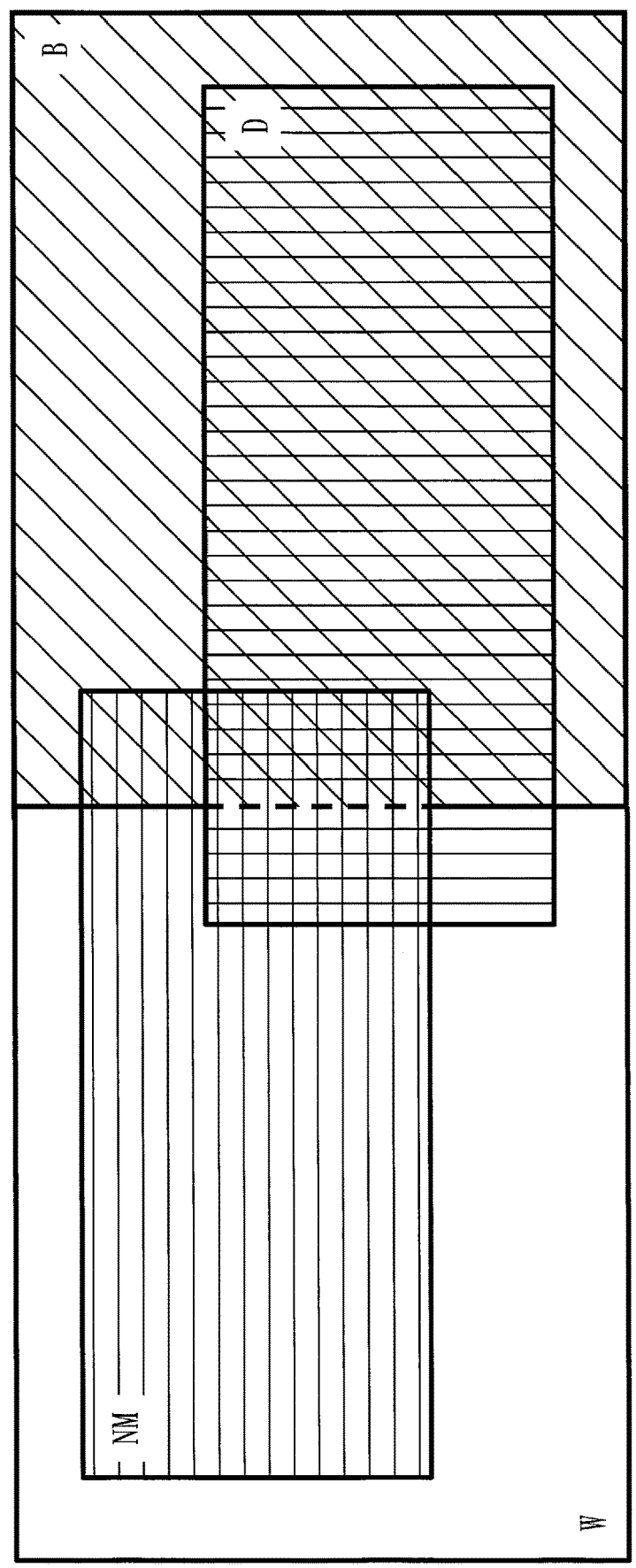
FIG. 8 is a diagram representing a population of sample data represented by a normal model and a population of sample data detected by a detection device according to the first embodiment.
Figure 9:
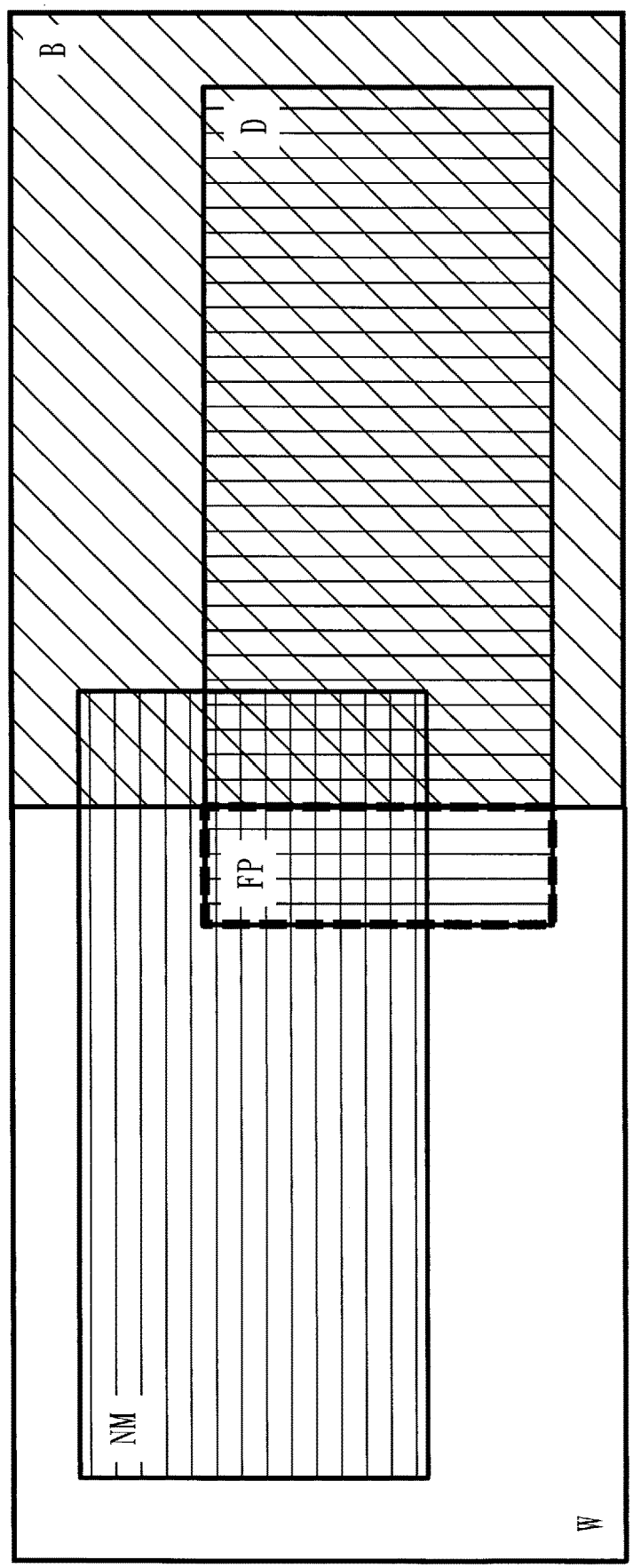
FIG. 9 is a diagram representing a population of false-detection sample data according to the first embodiment.

In FIG. 8, NM is a space of sample data represented by a normal model. Normal sample data cannot always be learned accurately, so that NM includes some pieces of non-normal sample data. A space D represents a population of sample data detected by a certain detection device. In the space B, a portion not covered by D represents missed-detection sample data.

Figure 10:
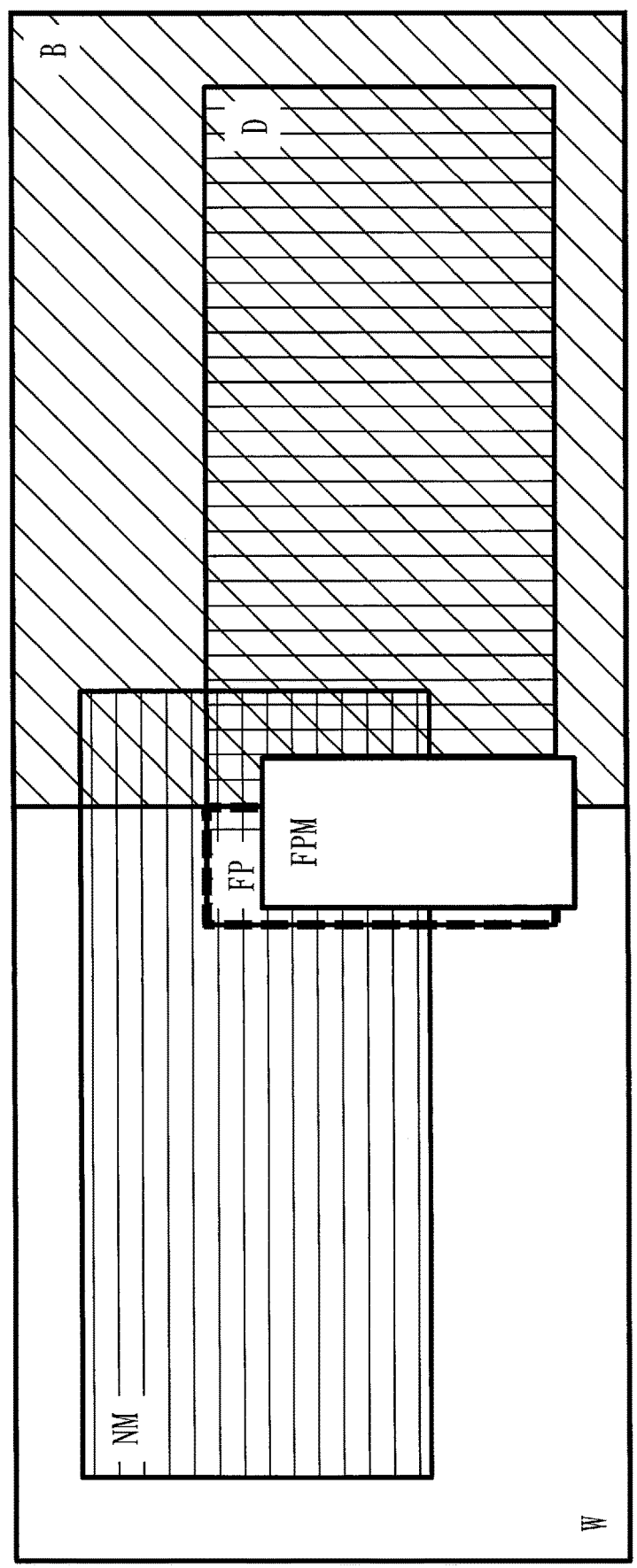
FIG. 10 is a diagram representing a population of sample data represented by a false-detection model according to the first embodiment.

The detection device does not always detect only non-normal sample data accurately. For this reason, the space D also includes normal sample data. Therefore, in FIG. 9, FP enclosed by dotted lines is a population of false-detection sample data. In FIG. 10, a space FPM is a space of sample data represented by a false-detection model generated from false-detection sample data. False-detection sample data cannot always be learned accurately, so that the space FPM includes some pieces of normal sample data not causing false detections or non-normal sample data.

<Missed-Detection Sample Data Generation Process>

Figure 11:
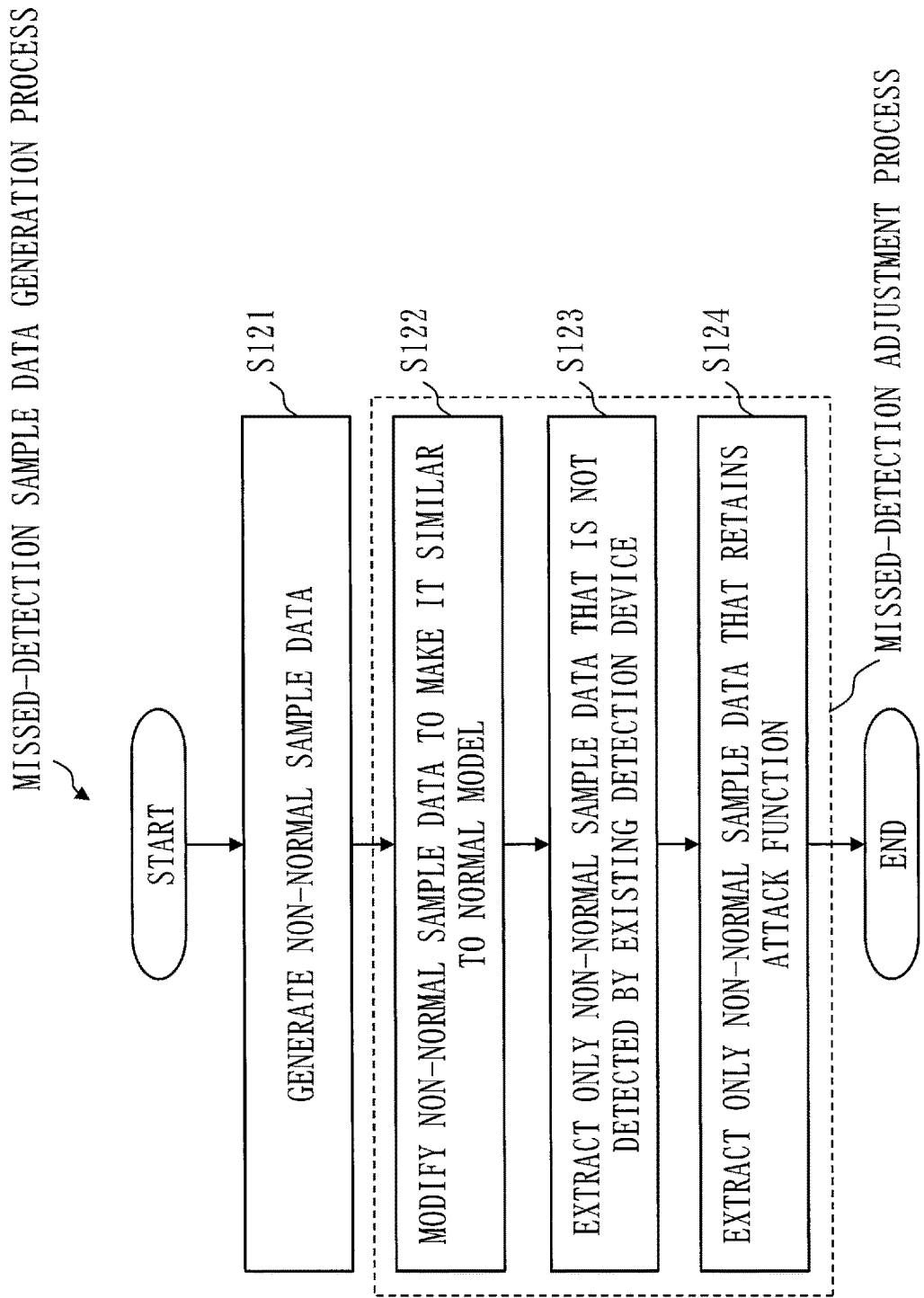
FIG. 11 is a flowchart of a missed-detection sample data generation process according to the first embodiment.

Next, a missed-detection sample data generation process will be described with reference to FIG. 11.

In step S121, the acquisition unit 10 acquires pieces of non-normal sample data, each of which is an anomalous event in the target system. Specifically, the non-normal sample generation unit 130 generates non-normal sample data. The non-normal sample generation unit 130 uses an existing attack generation tool to generate non-normal sample data that attacks the target system. Non-normal sample data is also referred to as attack sample data that attacks the target system.

In step S122, the adjustment unit 140 modifies non-normal sample data to make it similar to the normal model.

In step S123, the adjustment unit 140 extracts non-normal sample data that is not detected by an existing detection device. The non-normal sample generation unit 130 uses an attack tool to execute an attack with the non-normal sample data modified in step S122. The adjustment unit 140 checks whether this attack is detected by the existing detection device. The adjustment unit 140 extracts only non-normal sample data that is not detected.

In step S124, the adjustment unit 140 checks whether the non-normal sample data extracted in step S123 retains the attack function. Note that when the detection device detects a failure, the adjustment unit 140 checks whether the non-normal sample data retains the features of the failure. The adjustment unit 140 extracts non-normal sample data that retains the attack function as missed-detection sample data.

The non-normal generation unit 131 of the non-normal sample generation unit 130 of FIG. 4 generates non-normal sample data. The non-normal generation unit 131 is used in steps S121, S123, and S124. In steps S123 and S124, the non-normal generation unit 131 actually executes attacks having the same features as non-normal sample data.

The non-normal generation unit 131 uses an attack tool for generating sample data of an anomalous event in the system and a simulated environment to acquire pieces of non-normal sample data. Specifically, the non-normal generation unit 131 uses the attack tools 151 and the simulated environment 153 to actually execute simulated attacks having the same features as non-normal sample data. The attack tools 151 are a set of attack tools, each prepared individually for each target system in advance. The simulated environment 153 is a simulated target system prepared in a virtual environment. The simulated environment 153 is provided to prevent the actual system from being adversely affected by the execution of an attack. When the actual system is not affected, or there is no problem even if the actual system is affected, an attack may be executed in the real environment, and thus the simulated environment 153 is not necessary.

Each attack tool included in the attack tools 151 is a program having, as input, parameters for manipulating the features of non-normal sample data. The parameters are targets on which exploit code is executed, that is, information such as an IP address, a port number, and a service. The parameters may also be information such as, for example, the type of pseudo-malware to be installed after intrusion, the IP address of a command and control (C&C) server of an attacker, the encryption method of communication, the frequency and size of C&C communication, and the frequency and size of POST for information leakage.

The non-normal collection unit 132 of the non-normal sample generation unit 130 of FIG. 4 collects sample data of anomalous events from another system. Then, the non-normal collection unit 132 modifies the collected sample data for compatibility with the environment of the target system, so as to acquire pieces of non-normal sample data. Specifically, the non-normal collection unit 132 modifies non-normal sample data collected from a different environment for compatibility with the target system. Non-normal sample data collected from the different environment includes attack sample data, failure sample data, and other types of anomaly sample data. When the non-normal sample data collected from the different environment is a log, information such as a time stamp, an IP address, a host name, and a domain name may be different from those in a log of the environment of the target system. Therefore, the non-normal collection unit 132 modifies the information such as a time stamp, an IP address, a host name, and a domain name in order to make the information in the non-normal sample data collected from the different environment compatible with the target system.

Figure 12:
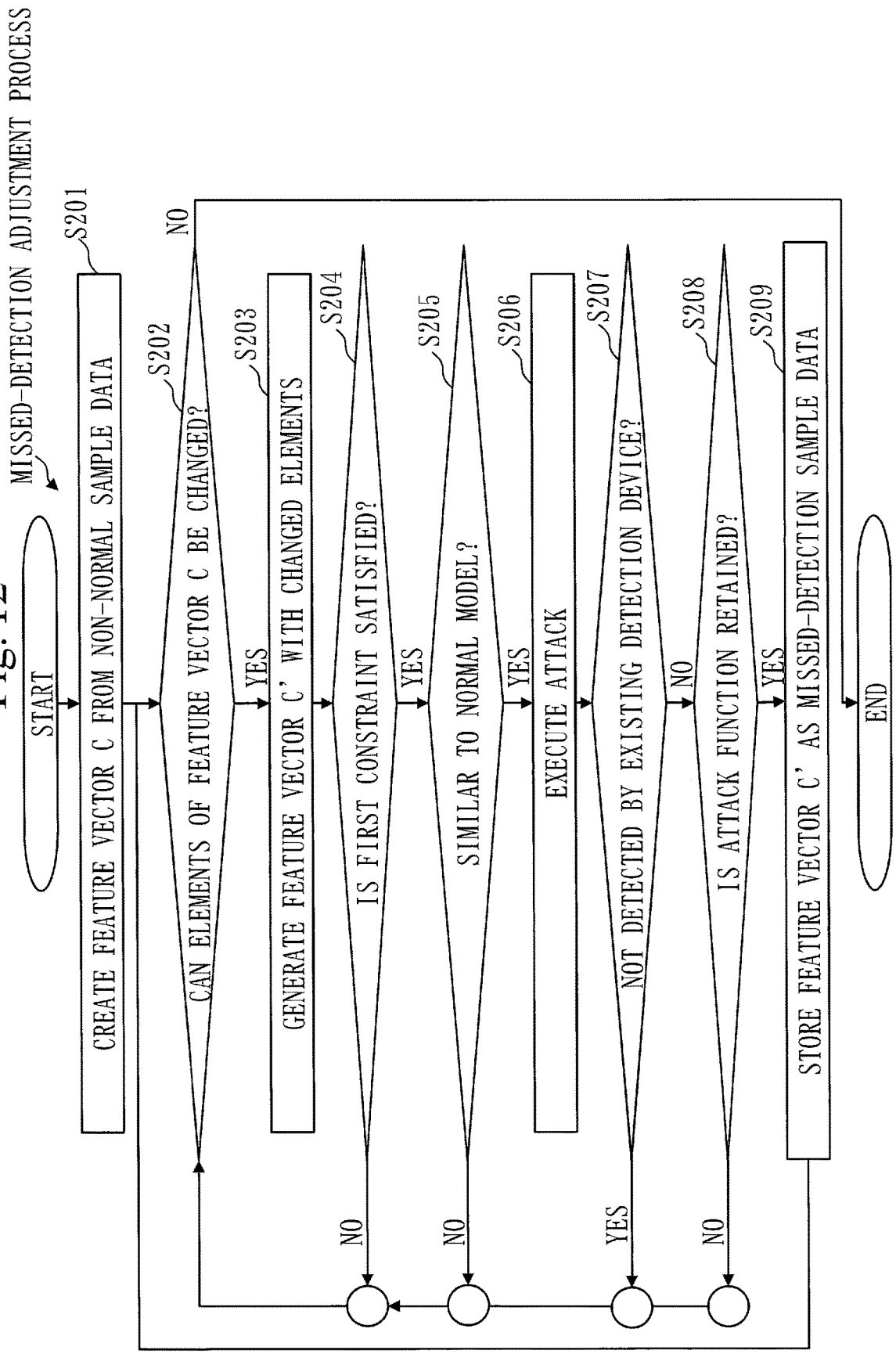
FIG. 12 is a detailed flowchart of a missed-detection adjustment process according to the first embodiment.

A missed-detection adjustment process in the missed-detection sample data generation process will be described in detail with reference to FIG. 12. The missed-detection adjustment process is the operation of the adjustment unit 140 in the missed-detection sample data generation process. As illustrated in FIG. 5, the adjustment unit 140 includes the change unit 141 and the verification unit 142. The change unit 141 includes the feature extraction unit 411 and the feature modification unit 412.

In steps S201 to S203, the change unit 141 generates a non-normal feature vector representing, as a vector, the features of non-normal sample data for each piece of non-normal sample data of the pieces of non-normal sample data. The change unit 141 also generates a non-normal changed vector obtained by changing the elements of the non-normal feature vector.

Specifically, in step S201, the feature extraction unit 411 generates a feature vector from non-normal sample data. The feature extraction unit 411 receives non-normal sample data and a first constraint. Then, the feature extraction unit 411 generates a feature vector $C=(c_1, c_2, \ldots, c_n)$ from the non-normal sample data. A feature vector C generated from non-normal sample data is also referred to as a non-normal feature vector.

In step S202, the feature modification unit 412 checks whether the elements of the feature vector can be changed. Specifically, a first change range ($LB_i \leq c_i \leq UB_i$) allowed for each element of the feature vector $C=(c_1, c_2, \ldots, c_n)$ is predefined. The feature modification unit 412 checks whether processing is performed for all non-normal feature vectors that can be obtained within this first change range. $LB_i$ and $UB_i$ are, respectively, the lower limit and the upper limit for $c_i$. If the elements of the feature vector can be changed, the process proceeds to S203.

In step S203, the feature modification unit 412 changes the elements of the feature vector C to generate a new feature vector C'. A feature vector C' obtained by changing a feature vector C generated from non-normal sample data is also referred to as a non-normal changed vector.

In steps S204 to S209, if the non-normal changed vector and the normal model are similar to each other, the verification unit 142 executes a process using the sample data represented by the non-normal changed vector on the system. Here, the process using the sample data represented by the non-normal changed vector may be executed in a simulated environment that simulates the system. The verification unit 142 verifies whether an anomalous event is detected by the detection device for detecting an anomalous event in the system. Upon verification that an anomalous event is not detected by the detection device, the verification unit 142 determines whether an anomalous event is present in the system, independently of the detection device. Upon determination that an anomalous event is present, the verification unit 142 stores the sample data represented by the non-normal changed vector in the storage unit 150 as missed-detection sample data 154 of the detection device.

Note that the verification unit 142 verifies whether an anomalous event is detected by the detection device only for a non-normal changed vector that satisfies the predefined first constraint for non-normal changed vectors. The verification unit 142 calculates a first similarity between the non-normal changed vector and the normal model, and determines that the non-normal changed vector and the normal model are similar to each other when the first similarity is equal to or greater than a first threshold.

Specifically, in step S204, the verification unit 142 checks whether the feature vector C' satisfies the first constraint. Here, the first constraint is a condition essential in the attack concerned, that is, the attack using non-normal sample data.

The detection of suspicious communication using a proxy log will be described below as an example. It is assumed that the elements indicated below are included in the feature vector. The elements and units thereof of the feature vector are to be changed to those appropriate for the target system.

When the model is differentiable, the elements may be updated using an algorithm that finds an optimal solution, such as stochastic gradient descent or steepest descent.

The elements of the feature vector are assumed to be $c_1$ and $c_2$.

$c_1$: average individual POST size [bytes/time]

$c_2$: POST cycle T [sec]

Suspicious communication aims to interact with the server of the attacker and transmit confidential data. Therefore, an evaluator may define that the first constraint is "the POST size per fixed time P [sec] is larger than the specified threshold", that is, "c1×(1/c2)×P>θ[bytes]", as the condition essential for the attack function.

If the feature vector C' satisfies the first constraint, the process proceeds to step S205. If the feature vector C' does not satisfy the first constraint, the process returns to step S202.

In step S205, the verification unit 142 obtains the feature vector C'=(c1+Δ1, c2+Δ2, . . . , cn+Δn) that satisfies the first constraint. The verification unit 142 uses the normal model to calculate a score S(C') for this feature vector C'. The score S(C') is an example of the first similarity. The normal model is assumed to be a classifier E. If the calculated score S(C') is equal to or greater than the specified first threshold, the verification unit 142 determines that the feature vector C' is similar to the normal model, and proceeds to step S206. If the score S(C') is less than the specified first threshold, the process returns to step S202.

In step S206, an attack corresponding to the feature vector C' similar to the normal model is executed by the non-normal generation unit 131. The non-normal generation unit 131 uses a corresponding attack tool among the attack tools 151 to execute the attack corresponding to the feature vector C' similar to the normal model. The simulated environment 153 may be used for the execution. The attack tool is a program having, as input, parameters that can adjust each element of the feature vector. For example, for the detection of suspicious communication using a proxy log, the attack tool can adjust the features of communication, such as the average individual POST size [bytes/time] and the POST cycle T [see]. The attack tool is prepared in advance according to the events (attacks, failures, or anomalies) to be detected in the target system.

In step S207, the verification unit 142 checks whether the executed attack is detected by the detection device. If detected, the process returns to step S202. If not detected, the process proceeds to step S208.

In step S208, the verification unit 142 checks whether the executed attack retains the attack function. The verification unit 142 determines whether an anomalous event is present in the system, independently of the detection device, and determines that the executed attack retains the attack function when an anomalous event is determined to be present. Examples of a method for checking whether the attack function is retained will be described below. The method for checking whether the attack function is retained may be different from the method of the following examples.

When the target of the detection device is a log entry, the verification unit 142 monitors whether the attack that has generated the log entry performs a basic function of the attack. The basic function here is a function such as file operation, user authentication, program startup, or upload of information to the outside. In order to monitor the presence or absence of the basic function, the verification unit 142 performs parsing of a log such as a Syslog or a communication log, so as to monitor whether a log entry related to the relevant operation is present.

When the target of the detection device is an email, the verification unit 142 checks whether the generated fraudulent email exhibits a basic function. The basic function here is an event such as actual clicking by mistake on a URL included in the text of the fraudulent email or an attached file by a person to whom the email has been sent. As part of the organization's training for dealing with suspicious emails, the verification unit 142 sends the fraudulent email to members of the organization, and monitors whether the URL in the text of the fraudulent email or the attached file is actually clicked. The attached file contains a script programmed to access a specific URL when clicked. In order to cause misidentification as a document file, the icon of a Portable Document Format (PDF) document or the like is used for the attached file.

When the target of the detection device is communication, the verification unit 142 monitors whether the generated attack communication performs a basic function. The basic function here is a function such as operation of a remote administration tool (RAT), interaction with a C&C server, or upload of a file.

When the target of the detection device is a file, the verification unit 142 checks whether the generated fraudulent file performs a basic function. The basic function here is a function such as execution of a program, deletion of a file, communication with a C&C server, or upload of a file.

If the attack function is not retained, the process returns to step S202. If the attack function is retained, the process proceeds to step S209.

In step S209, the verification unit 142 stores the feature vector C' as missed-detection sample data 154 in the storage unit 150. That is, the verification unit 142 records the missed-detection sample data that satisfies the first constraint, is sufficiently similar to the normal model, is not detected by the existing detection device, and retains the attack function. By using the first constraint, steps S205 to S209, which take time to process, can be omitted for vectors that do not clearly have the attack function on the feature space. Therefore, the efficiency of the missed-detection adjustment process can be increased.

<False-Detection Sample Data Generation Process>

Figure 13:
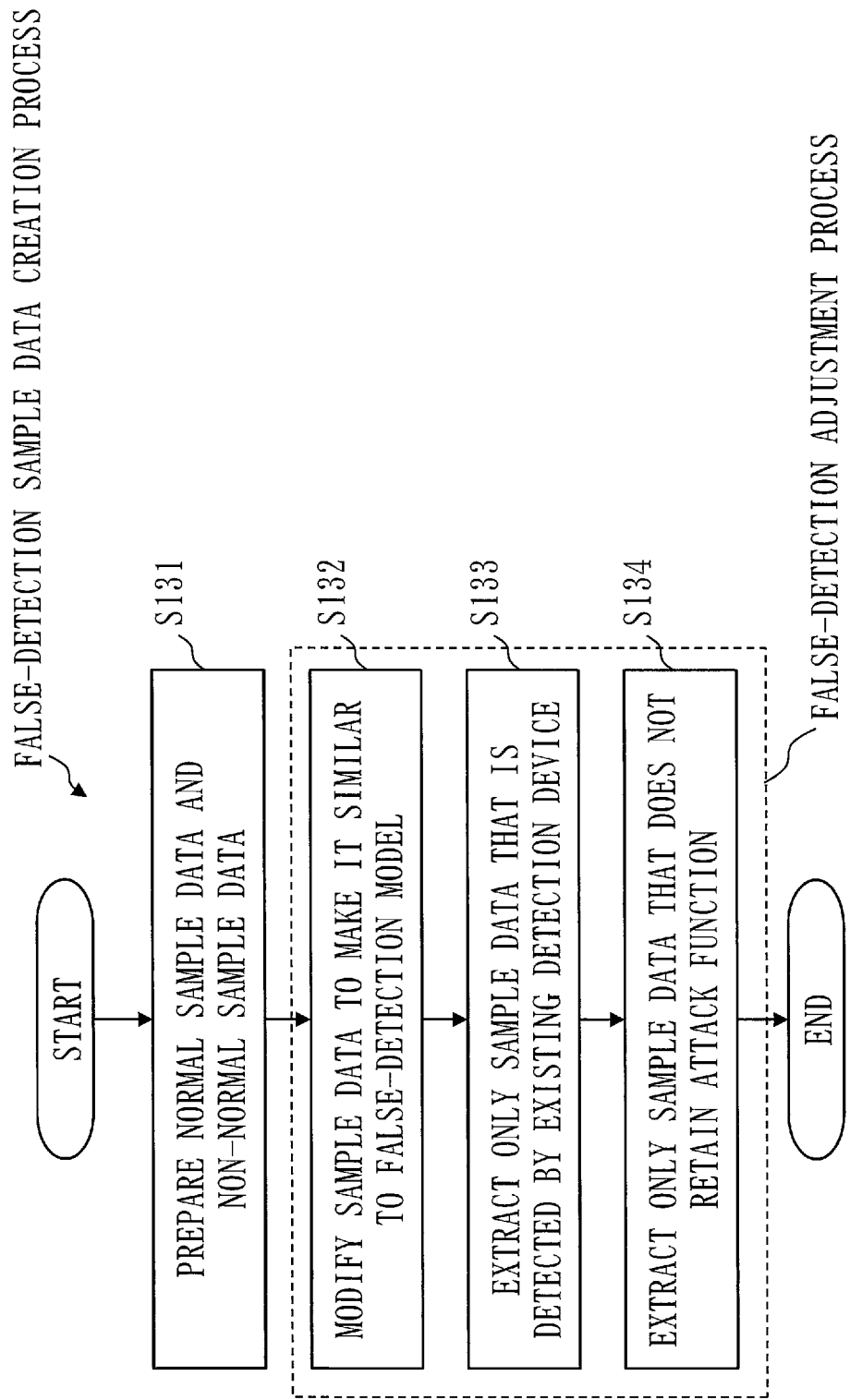
FIG. 13 is a flowchart of a false-detection sample data generation process according to the first embodiment.

Next, a false-detection sample data generation process will be described with reference to FIG. 13.

As illustrated in FIG. 2, the normal generation unit 112 of the normal sample generation unit 110 uses the sample generation tools 152 and the simulated environment 153 to generate normal sample data. The sample generation tools 152 are a set of tools for generating sample data, each prepared individually for each target system. The sample generation tools 152 are equivalent to the attack tools 151 in which the attack function is disabled. As described above, the simulated environment 153 is the target system simulated in a virtual environment.

In step S131, the normal sample generation unit 110 and the non-normal sample generation unit 130 prepare normal sample data and non-normal sample data, respectively. At this time, the normal sample generation unit 110 and the non-normal sample generation unit 130 may collect or newly generate normal sample data and non-normal sample data, respectively.

In step S132, the change unit 141 of the adjustment unit 140 generates a processing feature vector representing, as a vector, the features of processing sample data, for each piece of processing sample data out of pieces of processing sample data. The pieces of processing sample data include pieces of normal sample data and pieces of non-normal sample data. The change unit 141 generates a processing changed vector obtained by changing the elements of the processing feature vector. The adjustment unit 140 modifies processing sample data to make it similar to the false-detection model.

In step S133, the adjustment unit 140 extracts sample data that is detected by the existing detection device. The normal sample generation unit 110 uses the sample data generation tool and the simulated environment to actually execute events having the same features as sample data. The non-normal sample generation unit 130 uses the attack tool and the simulated environment to actually execute events having the same features as sample data. The events having the same features as sample data include those that simulate normal tasks such as access to the Web, file operation, and execution of a program. The adjustment unit 140 checks the presence or absence of detection by the existing detection device, and extracts only sample data that is detected.

In step S134, the adjustment unit 140 checks whether this sample data retains the attack function. The adjustment unit 140 extracts only sample data that does not retain the attack function as false-detection sample data.

Figure 14:
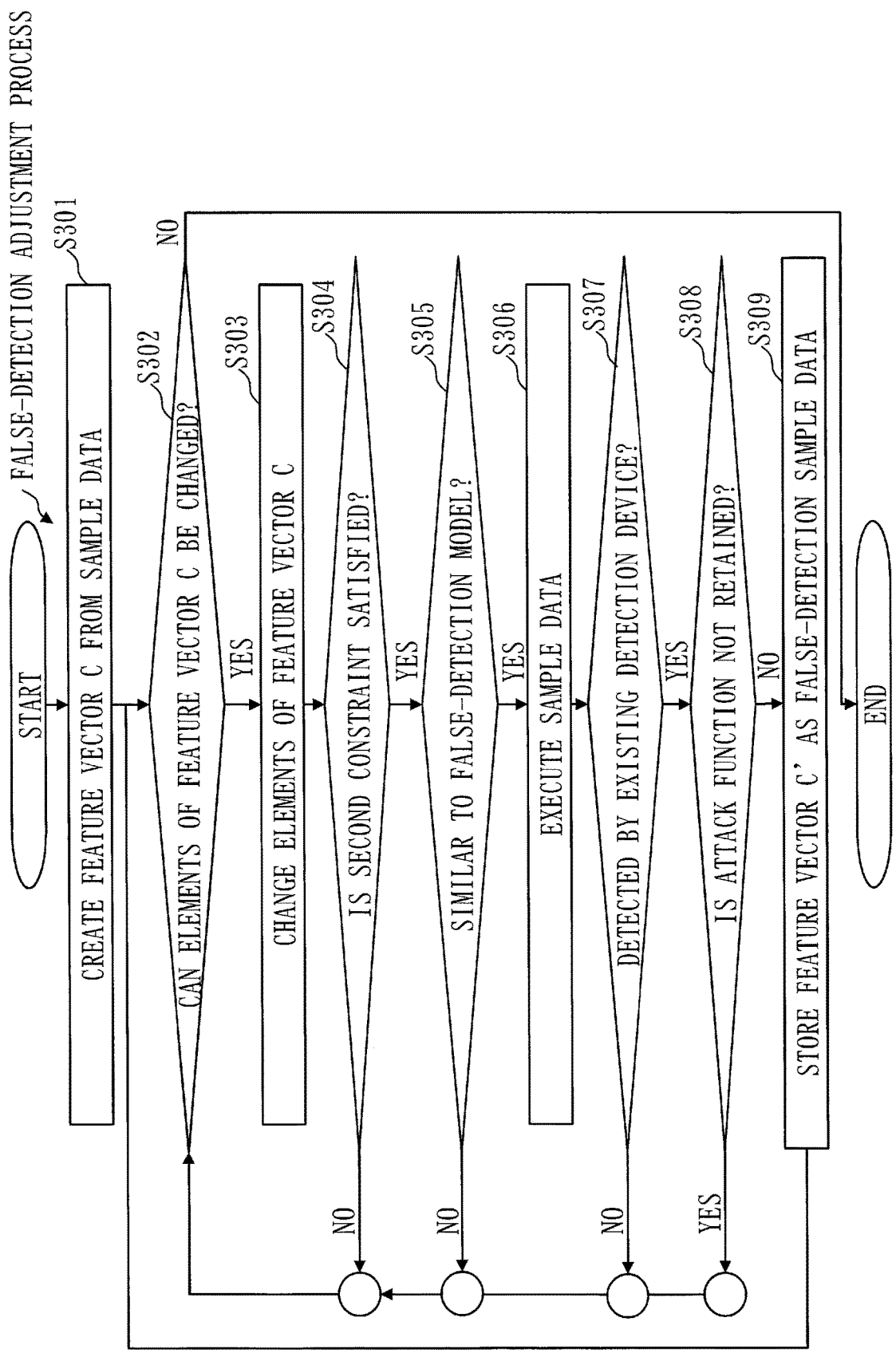
FIG. 14 is a detailed flowchart of a false-detection adjustment process according to the first embodiment.

A false-detection adjustment process in the false-detection sample data generation process will be described in detail with reference to FIG. 14. The false-detection adjustment process is the operation of the adjustment unit 140 in the false-detection sample data generation process.

In step S301, the feature extraction unit 411 of the change unit 141 generates a feature vector C from processing sample data. A feature vector C obtained from each piece of processing sample data is also referred to as a processing feature vector. Specifically, the feature extraction unit 411 receives sample data prepared in step S131 and a second constraint. Then, the feature extraction unit 411 generates a feature vector $C=(c_1, c_2, \ldots, c_n)$ from the sample data.

In step S302, the feature modification unit 412 checks whether the elements of the feature vector can be changed. Specifically, a second change range ($LB_i \le c_i \le UB_i$) allowed for each element of the feature vector $C=(c_1, c_2, \ldots, c_n)$ is predefined. The feature modification unit 412 checks whether processing is performed for all processing feature vectors that can be obtained within this second change range. $LB_i$ and $UB_i$ are, respectively, the lower limit and the upper limit for $c_i$. If the elements of the feature vector can be changed, the process proceeds to S303.

In step S303, the feature modification unit 412 changes the elements of the feature vector C to generate a new feature vector C'.

In step S304, the verification unit 142 checks whether the feature vector C' satisfies the second constraint. Here, the second constraint is the negation of a condition essential in the attack concerned, that is, the attack using sample data.

The detection of suspicious communication using a proxy log will be described below as an example. It is assumed that the elements indicated below are included in the feature vector. The elements and units thereof of the feature vector are to be changed to those appropriate for the target system.

c1: average individual POST size [bytes/time]

c2: POST cycle T [sec]

Suspicious communication aims to interact with the server of the attacker and transmit confidential data. Therefore, the evaluator may define that the second constraint is "the POST size per fixed time P [see] is smaller than or equal to the specified threshold", that is, "$c_1 \times (1/c_2) \times P \le \theta$[bytes]", as the negation of the condition essential for the attack function.

If the feature vector C' satisfies the second constraint, the process proceeds to step S305. If the feature vector C' does not satisfy the second constraint, the process returns to step S302.

In steps S305 to S309, if the processing changed vector and the false-detection model are similar to each other, the verification unit 142 executes a process using the sample data represented by the processing changed vector on the system. The system may be a simulated environment. The verification unit 142 verifies whether an anomalous event is detected by the detection device. Upon verification that an anomalous event is detected by the detection device, the verification unit 142 determines whether an anomalous event is present in the system, independently of the detection device. Upon determination that an anomalous event is not present, the verification unit 142 stores the sample data represented by the processing changed vector in the storage unit 150 as false-detection sample data 155 of the detection device.

Note that the verification unit 142 verifies whether an anomalous event is detected by the detection device only for a processing changed vector that satisfies the predefined second constraint for processing changed vectors. The verification unit 142 calculates a second similarity between the processing changed vector and the false-detection model, and determines that the processing changed vector and the false-detection model are similar to each other when the second similarity is equal to or greater than a second threshold.

In step S305, the verification unit 142 obtains the feature vector $C'=(c_1+\Delta_1, c_2+\Delta_2, \ldots, c_n+\Delta_n)$ that satisfies the second constraint. The verification unit 142 uses the false-detection model to calculate a score S(C') for this feature vector C'. The score S(C') is an example of the second similarity. The false-detection model is assumed to be a classifier E1. The false-detection model is a two-class classifier, so that the verification unit 142 checks the score S(C') in the false-detection class. If the calculated score S(C') is equal to or greater than the specified second threshold, the feature vector is determined to be similar to the false-detection model, and the process proceeds to step S306. If the score S(C') is less than the specified second threshold, the process returns to step S302.

In step S306, a corresponding sample data generation tool among the sample generation tools 152 is used to execute the sample data corresponding to the feature vector C' similar to the false-detection model. The simulated environment 153 may be used for the execution. The sample data generation tool is prepared in advance according to the events (attacks, failures, and anomalies) to be detected in the target system.

In step S307, the verification unit 142 checks whether the executed sample data is detected by the existing detection device. If not detected, the process returns to step S302. If detected, the process proceeds to step S308.

In step S308, the verification unit 142 checks whether the executed sample data retains the attack function. The determination of whether the attack function is retained is substantially the same as in step S208. If the attack function is retained, the process returns to step S302. If the attack function is not retained, the process proceeds to step S309.

In step S309, the verification unit 142 stores the feature vector C' as false-detection sample data 155 in the storage unit 150. That is, the verification unit 142 records the false-detection sample data that satisfies the second constraint, is sufficiently similar to the false-detection model, is detected by the existing detection device, and does not retain the attack function. Also here, by using the second constraint, steps S305 to S309, which take time to process, can be omitted for vectors that do not clearly have the attack function on the feature space. Therefore, the efficiency of the false-detection adjustment process can be increased.

Other Configuration

In this embodiment, an example of generating sample data for the attack detection device for detecting an attack has been mainly described. However, this embodiment can also be applied to a failure detection device for detecting a failure and an anomaly detection device for detecting other types of anomalies.

In this embodiment, the functions of the sample data generation apparatus 100 are realized by software. As a variation, however, the functions of the sample data generation apparatus 100 may be realized by hardware.

Figure 15:
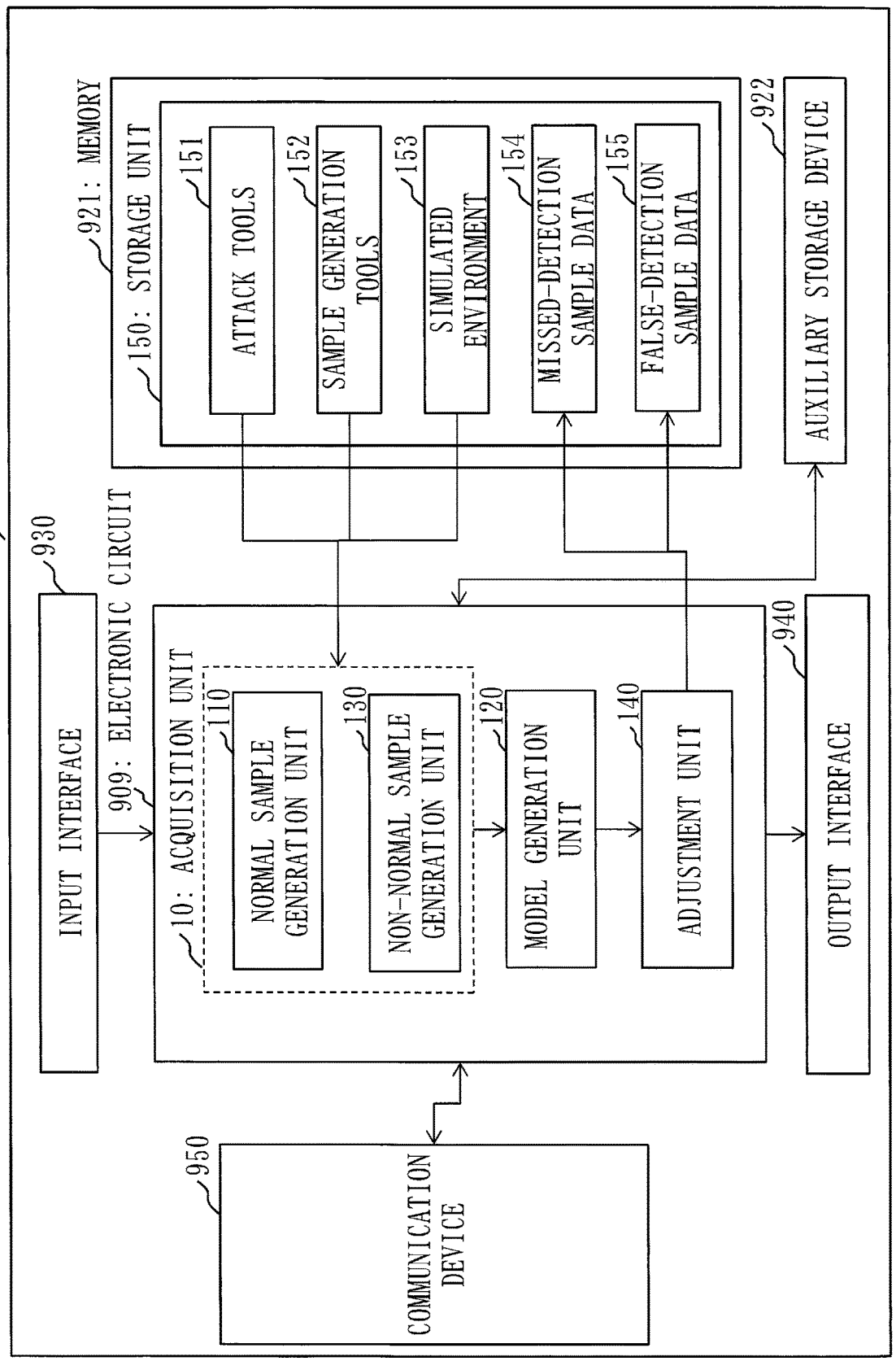
FIG. 15 is a configuration diagram of the sample data generation apparatus 100 according to a variation of the first embodiment.

FIG. 15 is a diagram illustrating a configuration of the sample data generation apparatus 100 according to the variation of this embodiment.

The sample data generation apparatus 100 includes an electronic circuit 909, the memory 921, the auxiliary storage device 922, the input interface 930, the output interface 940, and the communication device 950.

The electronic circuit 909 is a dedicated electronic circuit that realizes the functions of the acquisition unit 10, the model generation unit 120, and the adjustment unit 140 (the change unit 141 and the verification unit 142).

Specifically, the electronic circuit 909 is a single circuit, a composite circuit, a programmed processor, a parallel-programmed processor, a logic IC, a GA, an ASIC, or an FPGA. GA is an abbreviation for Gate Array. ASIC is an abbreviation for Application Specific Integrated Circuit. FPGA is an abbreviation for Field-Programmable Gate Array.

The functions of the components of the sample data generation apparatus 100 may be realized by one electronic circuit, or may be distributed among and realized by a plurality of electronic circuits.

As a different variation, some of the functions of the components of the sample data generation apparatus 100 may be realized by the electronic circuit, and the rest of the functions may be realized by software.

Each of the processor and the electronic circuit is also referred to as processing circuitry. That is, in the sample data generation apparatus 100, the functions of the acquisition unit 10, the model generation unit 120, the change unit 141, and the verification unit 142 are realized by the processing circuitry.

In the sample data generation apparatus 100, the "unit" of each of the acquisition unit 10, the model generation unit 120, the change unit 141, and the verification unit 142 may be interpreted as a "step" or a "process". The "process" of each of the acquisition process, the model generation process, the change process, and the verification process may be interpreted as a "program", a "program product", or a "computer readable storage medium recording a program".

Description of Effects of This Embodiment

According to the sample data generation apparatus 100 of this embodiment, it is possible to generate non-normal sample data that performs a malicious process within the range of the features of normal sample data. Therefore, the detection device can be enhanced to achieve high accuracy with few missed detections.

According to the sample data generation apparatus 100 of this embodiment, false-detection sample data can be automatically generated. Therefore, the detection device can be enhanced to achieve high accuracy with few false detections.

As described above, according to the sample data generation apparatus 100 of this embodiment, sufficient sample data related to missed detections and false detections that the detection device may cause can be automatically prepared, in order to increase the accuracy of the design and evaluation of the detection device.

Second Embodiment

In this embodiment, differences from the first embodiment will be described. Note that the components that are substantially the same as those in the first embodiment are denoted by the same reference signs, and description thereof may be omitted.

Figure 16:
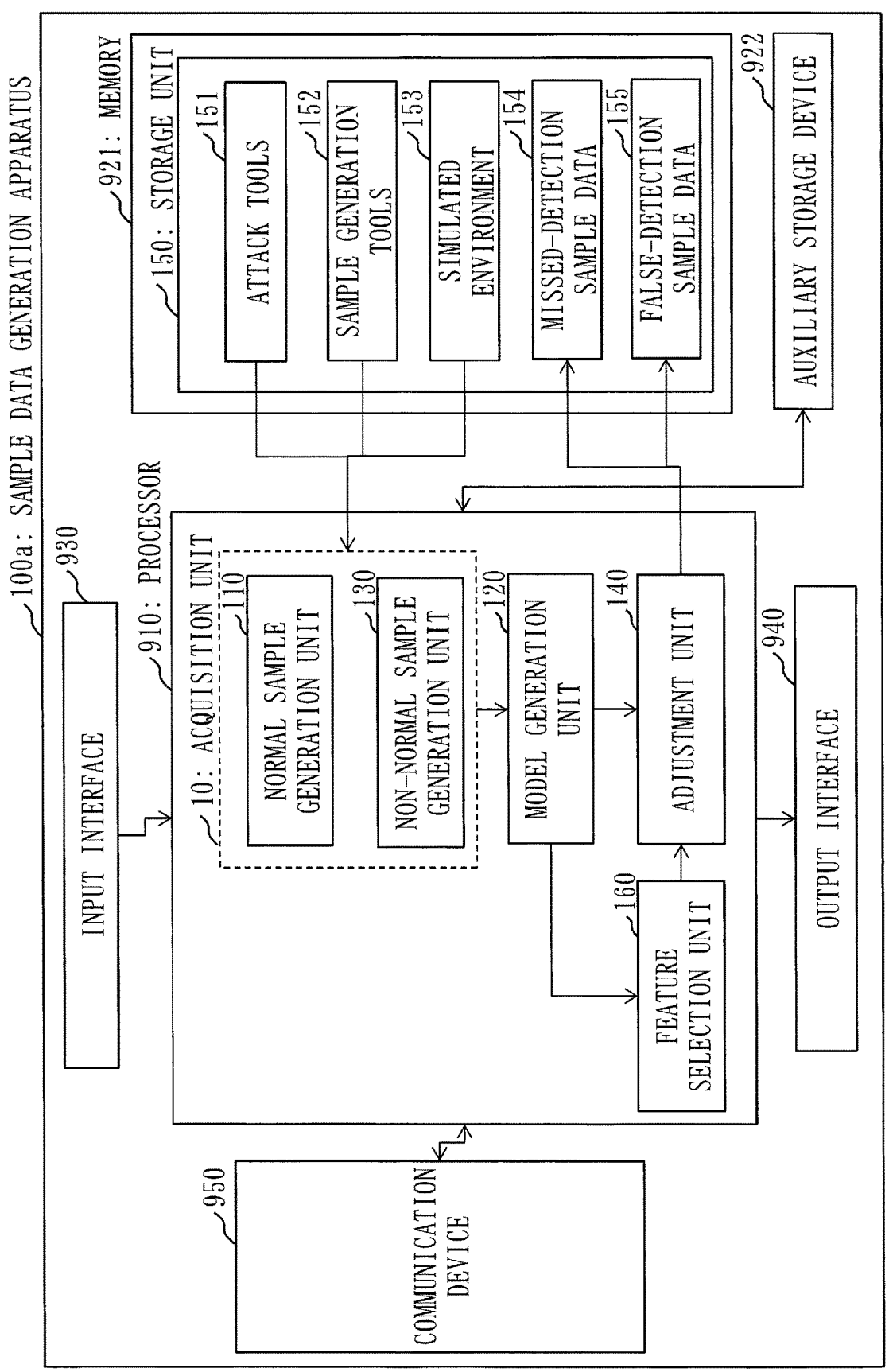
FIG. 16 is a configuration diagram of a sample data generation apparatus 100a according to a second embodiment.

A configuration of a sample data generation apparatus 100a according to this embodiment will be described with reference to FIG. 16. The sample data generation apparatus 100a includes a feature selection unit 160 in addition to the components of the sample data generation apparatus 100 of the first embodiment.

The feature selection unit 160 extracts features based on the contributions to the classification of false-detection sample data.

A feature selection process using the feature selection unit 160 according to this embodiment will be described with reference to FIG. 17.

In step S161, the model generation unit 120 generates a false-detection model. The model generation unit 120 uses a two-class classifier for classification as normal sample data not causing a false detection or normal sample data causing a false detection. At this time, the model generation unit 120 uses an algorithm that outputs a contribution of a feature.

In step S162, the feature selection unit 160 calculates a contribution of each feature to each class. For example, in random forests, a contribution of each feature used for identification is calculated. The greater the contribution, the more important the feature is to identification. Features that strongly influence identification can also be inferred from information such as the weighting factors, odds ratios, or sensitivity analysis results of learned models, in addition to the contributions.

In step S163, the feature selection unit 160 extracts a feature having a large contribution to the classification into the class of normal sample data causing a false detection. This makes it possible to extract features that strongly influence the classification as an attack (false detection).

The features extracted by the feature selection unit 160 are used as the elements of the feature vector to be modified by the feature modification unit 412 of the adjustment unit 140. This can reduce the number of candidates for modification, and improve the efficiency of generation of missed-detection sample data and false-detection sample data.

In the first and second embodiments, each unit of the sample data generation apparatus has been described as an independent functional block. However, the configuration of the sample data generation apparatus is not limited to the configurations described in the above embodiments. The functional blocks of the sample data generation apparatus may be arranged in any configuration, provided that the functions described in the above embodiments can be realized.

Portions of the first and second embodiments may be implemented in combination. Alternatively, one portion of these embodiments may be implemented. Alternatively, these embodiments may be implemented as a whole or partially in any combination.

Note that the embodiments described above are essentially preferred examples and are not intended to limit the scope of the present invention, the scope of applications of the present invention, and the scope of intended uses of the present invention. Various modifications may be made to the embodiments described above as necessary.

REFERENCE SIGNS LIST

10: acquisition unit; 100, 100a: sample data generation apparatus; 110: normal sample generation unit; 111:

normal collection unit; 112: normal generation unit; 120: model generation unit; 121: feature conversion unit; 122: learning unit; 130: non-normal sample generation unit; 131: non-normal generation unit; 132: non-normal collection unit; 140: adjustment unit; 141: change unit; 142: verification unit; 411: feature extraction unit; 412: feature modification unit; 150: storage unit; 151: attack tools; 152: sample generation tools; 153: simulated environment; 154: missed-detection sample data; 155: false-detection sample data; 160: feature selection unit; 909: electronic circuit; 910: processor; 921: memory; 922: auxiliary storage device; 930: input interface; 940: output interface; 950: communication device

The invention claimed is:

1. A sample data generation apparatus comprising:
processing circuitry; and
a memory storing instructions executable by the processing circuitry, the instructions comprising steps to:
  acquire pieces of normal sample data, each of which is a normal event in a system and pieces of non-normal sample data, each of which is an anomalous event in the system;
  generate a normal model representing the pieces of normal sample data,
  generate, for each piece of non-normal sample data of the pieces of non-normal sample data, a non-normal feature vector representing, as a vector, features of the non-normal sample data, and generate a non-normal changed vector obtained by changing an element of the non-normal feature vector; and
  execute, when a similarity score representing a similarity between the non-normal changed vector and the normal model meets a predefined criteria, a process using sample data represented by the non-normal changed vector on the system, verify whether an anomalous event is detected by a detection device for detecting an anomalous event in the system, and upon verification that an anomalous event is not detected by the detection device, determine whether an anomalous event is present in the system, independently of the detection device, and upon determination that an anomalous event is present, store the sample data represented by the non-normal changed vector in a memory as missed-detection sample data of the detection device.

2. The sample data generation apparatus according to claim 1,
  wherein the processing circuitry acquires, as false-detection sample data, normal sample data that is falsely detected by the detection device, out of the pieces of normal sample data, and generates a model representing the false-detection sample data as a false-detection model,
  wherein for each piece of processing sample data of pieces of processing sample data including the pieces of normal sample data and the pieces of non-normal sample data, the processing circuitry generates a processing feature vector representing, as a vector, features of the processing sample data, and generates a processing changed vector obtained by changing an element of the processing feature vector, and
  wherein when the processing changed vector and the false-detection model are similar to each other, the processing circuitry executes a process using sample data represented by the processing changed vector on the system, verifies whether an anomalous event is detected by the detection device, and upon verification that an anomalous event is detected by the detection device, determines whether an anomalous event is present in the system, independently of the detection device, and upon determination that an anomalous event is not present, stores the sample data represented by the processing changed vector in the memory as false-detection sample data of the detection device.

3. The sample data generation apparatus according to claim 2, wherein the processing circuitry calculates a first similarity between the non-normal changed vector and the normal model, and determines that the non-normal changed vector and the normal model are similar to each other when the first similarity is equal to or greater than a first threshold.

4. The sample data generation apparatus according to claim 2, wherein the processing circuitry calculates a second similarity between the processing changed vector and the false-detection model, and determines that the processing changed vector and the false-detection model are similar to each other when the second similarity is equal to or greater than a second threshold.

5. The sample data generation apparatus according to claim 2, wherein the processing circuitry
  acquires the pieces of normal sample data by collecting sample data of normal events from another system other than the system, and modifying the collected sample data for compatibility with an environment of the system, and
  acquires the pieces of normal sample data, using a sample generation tool for generating sample data of a normal event in the system and a simulated environment.

6. The sample data generation apparatus according to claim 2, wherein the processing circuitry
  acquires the pieces of non-normal sample data by collecting sample data of anomalous events from another system other than the system, and modifying the collected sample data for compatibility with an environment of the system, and
  acquires the pieces of non-normal sample data, using an attack tool for generating sample data of an anomalous event in the system and a simulated environment.

7. The sample data generation apparatus according to claim 2, wherein the processing circuitry
  converts each of the pieces of normal sample data into a feature vector, and
  learns the normal model from feature vectors obtained by conversion, using machine learning technology.

8. The sample data generation apparatus according to claim 2, wherein the processing circuitry changes an element of the non-normal feature vector within a range of a first change range defined for each element of the non-normal feature vector.

9. The sample data generation apparatus according to claim 2, wherein the processing circuitry changes an element of the processing feature vector within a range of a second change range defined for each element of the processing feature vector.

10. The sample data generation apparatus according to claim 2, wherein the system is provided in a simulated environment simulated in a virtual environment.

11. The sample data generation apparatus according to claim 2, wherein the processing circuitry verifies whether an anomalous event is detected by the detection device only for the non-normal changed vector that satisfies a predefined first constraint for the non-normal changed vector.

12. The sample data generation apparatus according to claim 2, wherein the processing circuitry verifies whether an anomalous event is detected by the detection device only for the processing changed vector that satisfies a predefined second constraint for the processing changed vector.

13. The sample data generation apparatus according to claim 2, wherein the processing circuitry extracts a feature, based on a contribution to classification of the false-detection sample data.

14. A sample data generation method comprising:
acquiring pieces of normal sample data, each of which is a normal event in a system and pieces of non-normal sample data, each of which is an anomalous event in the system;
generating a normal model representing the pieces of normal sample data;
generating, for each piece of non-normal sample data of the pieces of non-normal sample data, a non-normal feature vector representing, as a vector, features of the non-normal sample data, and generating a non-normal changed vector obtained by changing an element of the non-normal feature vector; and
executing, when a similarity score representing a similarity between the non-normal changed vector and the normal model meets a predefined criteria, a process using sample data represented by the non-normal changed vector on the system, verifying whether an anomalous event is detected by a detection device for detecting an anomalous event in the system, and upon verification that an anomalous event is not detected by the detection device, determining whether an anomalous event is present in the system, independently of the detection device, and upon determination that an anomalous event is present, storing the sample data represented by the non-normal changed vector in a memory as missed-detection sample data of the detection device.

15. A non-transitory computer readable medium storing a sample data generation program for causing a computer to execute:
an acquisition process to acquire pieces of normal sample data, each of which is a normal event in a system and pieces of non-normal sample data, each of which is an anomalous event in the system;
a model generation process to generate a normal model representing the pieces of normal sample data;
a change process to, for each piece of non-normal sample data of the pieces of non-normal sample data, generate a non-normal feature vector representing, as a vector, features of the non-normal sample data, and generate a non-normal changed vector obtained by changing an element of the non-normal feature vector; and
a verification process to, when a similarity score representing a similarity between the non-normal changed vector and the normal model meets a predefined criteria, execute a process using sample data represented by the non-normal changed vector on the system, verify whether an anomalous event is detected by a detection device for detecting an anomalous event in the system, and upon verification that an anomalous event is not detected by the detection device, determine whether an anomalous event is present in the system, independently of the detection device, and upon determination that an anomalous event is present, store the sample data represented by the non-normal changed vector as missed-detection sample data of the detection device.

* * * * *